April 26, 1966  E. V. BUNTING ET AL  3,247,910
DUAL HYDRAULIC LIFT ARRANGEMENT WITH LATERAL FLEXIBILITY
Filed Jan. 24, 1963  2 Sheets-Sheet 1

INVENTORS
Ernest V. Bunting, &
BY Glennard T. Olson
Wolfe, Hubbard, Voit & Osann
ATTORNEYS INVENTORS
Ernest V. Bunting, &
BY Glennard J. Olson
Wolfe, Hubbard, Voit & Osann
ATTORNEYS

United States Patent Office 3,247,910
Patented Apr. 26, 1966

3,247,910
DUAL HYDRAULIC LIFT ARRANGEMENT WITH LATERAL FLEXIBILITY
Ernest V. Bunting and Glennard T. Olson, Detroit, Mich., assignors to Massey-Ferguson Inc., Detroit, Mich., a corporation of Maryland
Filed Jan. 24, 1963, Ser. No. 253,685
8 Claims. (Cl. 172—460)

The present invention relates generally to tractors of the type equipped with a power elevatable hitch linkage and more particularly concerns a hitch linkage with dual hydraulic lift cylinders for such tractors when used with mounted and semi-mounted implements of substantial width.

As the horsepower and efficiency of agricultural tractors has increased, it has become possible to mount larger and larger implements on the hydraulically operated hitch linkage of the tractor. Typically, the tractor hitch linkage includes two spaced-apart power elevatable draft links which operate in unison to raise and lower the mounted or semi-mounted implement. These draft links, which are generally pivoted to the tractor rear housing, ordinarily rise and fall with the tractor as the tractor wheels encounter rough or uneven terrain. Moreover, an implement coupled to the tractor draft links also rises and falls almost in unison with the tractor wheels. However, with an implement which is considerably wider than the tractor itself, the depth of operation from one side of the implement to the other often varies markedly due to the slope of the ground outboard of the tractor wheels.

Accordingly, the primary aim of the present invention is to provide an improved hitch linkage with dual hydraulic lift cylinders, which is especially adapted for use with mounted and semi-mounted implements of substantial width, and in which the hydraulically actuated lift arms are interconnected to selectively permit lateral flexibility of the implement when it is operated over rough terrain.

A more particular object of the invention is to provide means interconnecting the dual hydraulically actuated lift arms whereby the lift arms may be positively locked together or released for lateral tilting movement even though large disproportionate loads or forces are exerted on the respective lift arms.

It is also an object of the invention to provide such a dual hydraulic lift arrangement in which the lifting force of each of the lift arms remains the same when they are allowed to tilt relative to each other since the oil in the dual lifting cylinders is allowed to flow back and forth between the cylinders thereby permitting the tilting action without affecting the lifting force exerted by each cylinder.

Another object of the invention is to provide a dual hydraulic lift arrangement as described above which includes position sensing means to automatically average the required adjustment in the position control linkage for the two interconnected draft links.

A further object of the invention is to provide such a dual hydraulic lift arrangement in which the lift arms and draft links may be easily and conveniently locked at normal drawbar height when the hydraulic lift arrangement is not in use.

Yet another object is to provide a dual hydraulic lift arrangement of the above character in which the means interconnecting the two lift arms, as well as the sensing means and locking device, is located within the rear housing of the tractor away from dust and dirt which would detrimentally effect its operation.

An additional object is to provide a dual hydraulic lift arrangement as described above which is simple and economical to manufacture and yet durable and trouble free in operation even under prolonged conditions of heavy use.

Other objects and advantages of the invention will become apparent upon reading the following detailed description and upon reference to the drawings in which.

While the invention will be described in connection with a preferred embodiment, it will be understood that we do not intend to limit the invention to that embodiment. On the contrary, we intend to cover all alternatives, modifications, and equivalents as may be included within the spirit and scope of the invention as defined by the appended claims.

Figure 1:
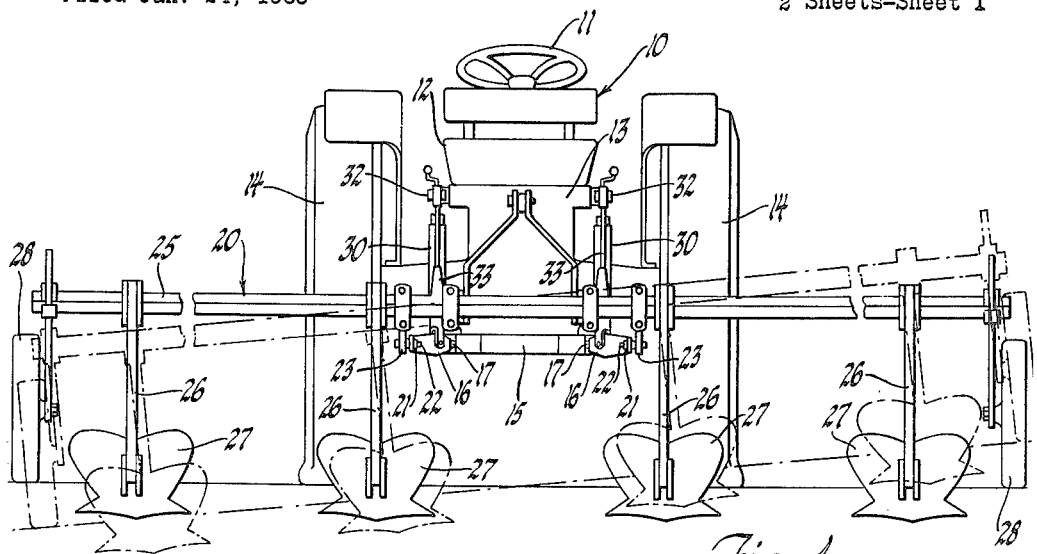
FIGURE 1 is a rear elevation of a tractor with a hydraulically operated hitch linkage embodying the present invention and carrying a semi-mounted implement, with solid lines indicating the normal, level position, and dash lines indicating the implement in a tilted position.

Turning now to the drawings, there is shown in FIG. 1 the rear portion of an agricultural tractor 10 which embodies the improved hitch linkage with dual hydraulic lift arrangement of the present invention. The tractor 10 is provided with a steering wheel 11 and an operator's seat 12 mounted above a rear housing 13 which journals a pair of power-driven traction wheels 14. The underside of the rear housing 13 includes a frame portion 15 to which a pair of trailing draft links 16 are pivotally mounted for universal swinging movement by means of ball and socket connections 17 and cross bolts 18.

In the illustrated embodiment, an implement in the form of a four-bottom lister 20 is mounted at the trailing ends of the draft links 16. For this purpose, the draft links 16 carry ball swivels 21 adapted to engage a pair of laterally projecting draft pins 22 secured to spaced-apart frame elements 23 of the implement 20. It will be understood that the main frame of such an implement may be in the form of an elongated tool bar 25 which extends laterally a substantial distance on either side of the tractor wheels 14. The tool bar 25 mounts a plurality of laterally positionable tool shanks 26, each of which carries a lister bottom 27. At the outer ends of the tool bar 25, vertically adjustable gauge wheels 28 serve to limit the maximum depth of operation of the outboard lister bottoms and support that portion of implement weight not carried by the lift links.

It will also be understood that the working depth of the lister 20 is governed by the position of the elevatable draft links 16. Thus, as the draft links are raised the lister bottoms 27 are withdrawn from the soil, and conversely, as the links are lowered the lister bottoms enter and engage the soil. Furthermore, by transferring a portion of the weight and soil suction forces of the implement 20 to the tractor 10 increased traction is provided to pull the implement.

Figure 2:
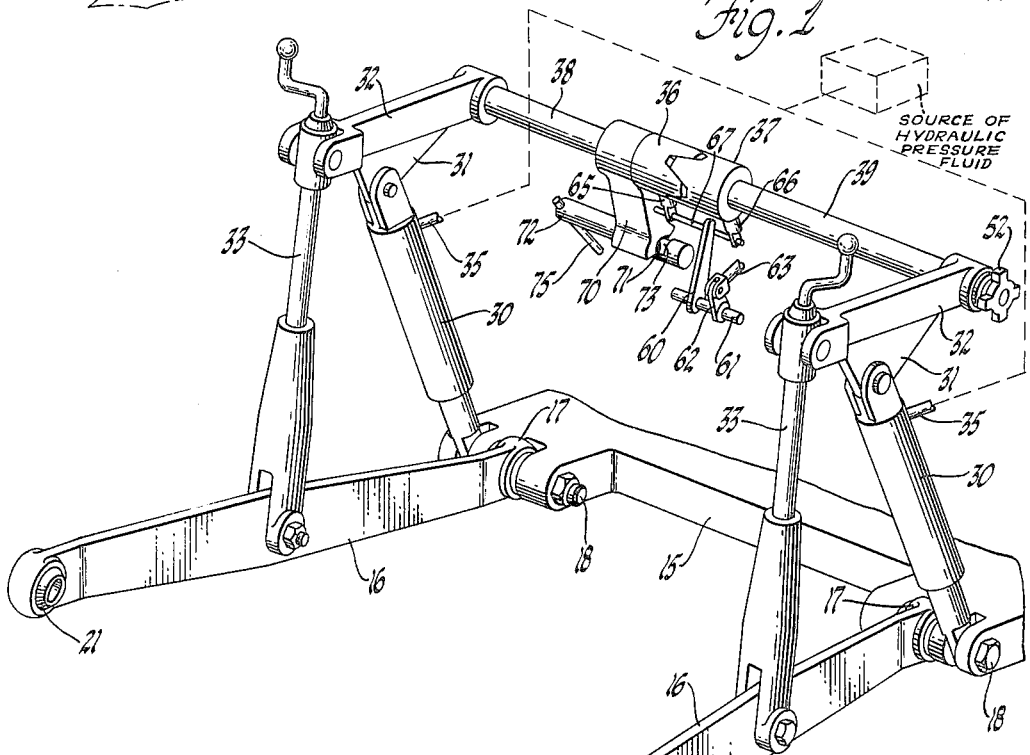
FIGURE 2 is an enlarged fragmentary perspective of the hitch shown in FIG. 1.

The position of the draft links 16 and thus the depth of operation of the mounted implement 20 is controlled by a pair of hydraulic cylinders 30, as shown in FIG. 2. The hydraulic cylinders 30 preferably have their lower ends mounted on the frame 15 by means of the cross bolts 18 and are pivotally attached at their upper ends to flanged portions 31 of a pair of lift arms 32. The lift arms 32 are pivotally mounted on the upper portion of the rear housing 13 of the tractor and the outer ends of the lift arms 32 are connected to the draft links 16 by vertically adjustable drop links 33. Hydraulic pressure fluid is supplied to the lift cylinders 30 through pressure lines 35 from a suitable pump and control device located within the tractor. Thus, it will be appreciated that as fluid is pumped into the cylinders 30 through the lines 35 the lift arms 32 are urged upwardly and the drop links 33 raise the draft links 16 and the attached implement 20.

In accordance with the present invention, the dual hydraulic lift cylinders are interconnected with means for providing lateral torsional flexibility between the tractor 10 and the implement 20 to permit the implement to "tilt" independently of the tractor. Thus, even if one tractor wheel 14 drops into a hole, or if the ground slopes away outboard of one of the tractor wheels, the depth of operation of the implement remains substantially uniform across the entire width of the implement. In the preferred embodiment, the pivotally mounted lift arms 32 are interconnected with interfitting elements 36 and 37 which selectively permit limited relative pivotal movement of one lift arm with respect to the other and thus allow lateral tilting movement of the implement 20 mounted on the draft links 16. The interfitting elements 36, 37 are preferably in the form of collars splined on respective cross shafts 38 and 39 journalled in the tractor rear housing 13 and to which the lift arms 32 are splined at the outer ends. As shown in FIG. 2, the interfitting elements 36, 37 have axially projecting teeth 40 and 41 respectively, which are narrower at their outer ends than at their base portions.

To selectively permit lateral tilting of the implement 20, means are included within the rear housing 13 of the tractor for axially shifting one of the elements 37 with respect to the other element 36 whereby, due to the tapered shape of the teeth 40, 41, a limited amount of relative pivotal movement is provided between the lift arms 32. In the illustrated embodiment, the means for axially shifting the end element 37 includes an elongated rod 45 which extends through respective center bores 46 and 47 in the cross shafts 38, 39. The rod 45 is formed with a threaded center portion 48 which engages a threaded sleeve element 49 keyed to the cross shaft 38 by means of two radially projecting pins 51 which restrain the sleeve element from rotation while permitting axial sliding movement. To permit easy turning of the rod 45, a handle 52 is secured to the rod at one end. The other end of the rod is threaded to receive a lock nut 54 which prevents the rod, lift arms, and cross shafts from axially shifting. Thus, it will be seen that as the handle 52 is rotated, the threaded sleeve element 49 shifts axially on the rod 45.

In order to axially shift the interfitting element 37, a ring element in the form of a large washer 55 is slidably mounted on the rod 45 and is biased against the slidable element 49 by means of a compresssion spring 56 which surrounds the rod 45 and is contained in an enlarged bore 57 of the stub shaft 39. The ring element 55 is connected to the interfitting element 37 by means of radially projecting pins 58 inserted into openings 59 in the teeth 41 and retained in place by means of transverse pins 58a. Thus, it will be appreciated that as the handle 52 is turned, the slidable element 49 moves axially on the threaded portion 48 of the rod and shifts the ring element 55 against the biasing force of the spring 56 carrying with it the interfitting element 37. If, for example, the handle 52 is rotated clockwise (as seen in FIG. 2), the end element 37 is axially shifted to the right from the position shown in FIG. 3 to the position shown in FIG. 5.

Figure 3:
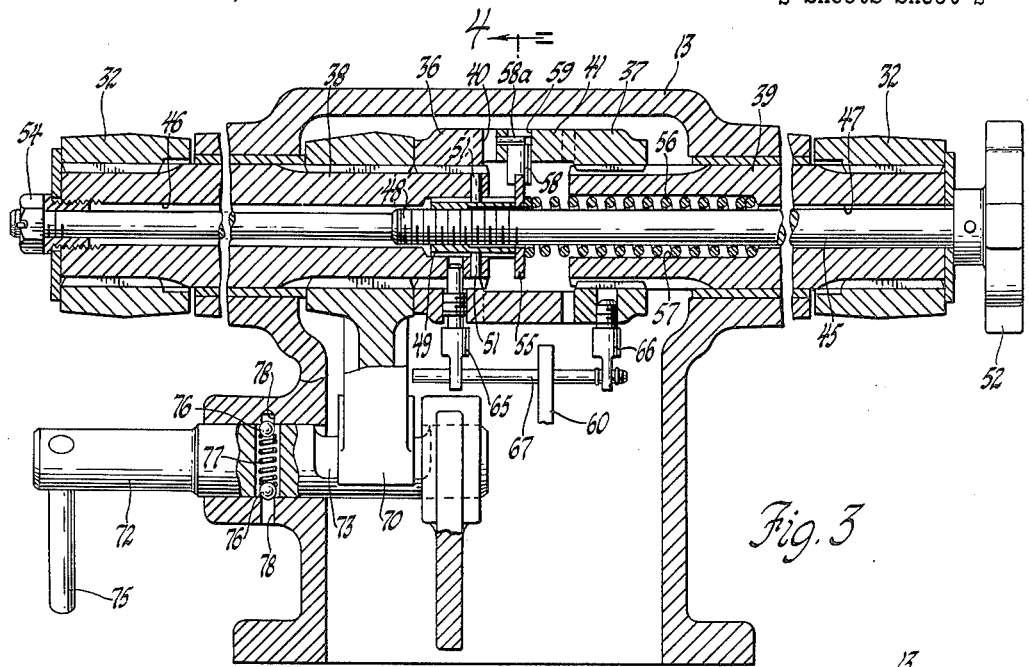
FIG. 3 is an enlarged partial cross section, with portions broken out, of the rear housing of the tractor of FIG. 1 showing the means interconnecting the lift arms in their fully closed position.
Figure 5:
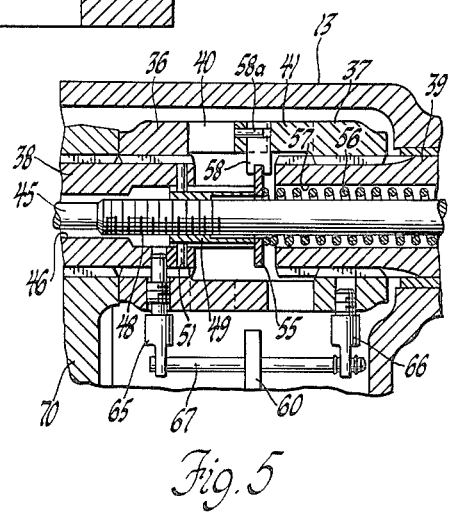
FIG. 5 is a fragmentary cross section similar to FIG. 3 showing the means interconnecting the lift arms in their fully retracted position.

It will also be understood that when the handle 52 is rotated in a counter clockwise direction (as seen in FIG. 2), the sleeve element 49 is axially shifted to the left from the position shown in FIG. 5 toward the position shown in FIG. 3. The movement of the interfitting element 37 into locking engagement with element 36, however, is dependent upon the biasing force of the spring 56. Moreover, when the lifting arms 32 are unequally loaded, the spring 56 must not only overcome the increased frictional force at the splines and between the teeth 40, 41, but also the separating force which arises from the camming action of the tapered teeth 40, 41. It will be noted, however, that when the lift arms 32 are raised to their highest position by the cylinders 30, the interfitting elements 36, 37 are automatically positioned with the teeth 40, 41 alined for free engagement. The spring 56 is ethen free to move the element 37 into its left-hand position wherein there is zero clearance between the teeth 40, 41 and the lift arms 32 are locked together.

In further accordance with the present invention the two lift arms 32 are supported on a fluid cushion which permits relative pivotal movement of the lift arms within the range defined by the separation of the interfitting teeth 40, 41. To this end, the dual hydraulic lift cylinders 30 are interconnected through pressure lines 35 to a common source of hydraulic pressure fluid (indicated by dashlines in FIG. 2). As mentioned above, the hydraulic pressure fluid is supplied to the lift cylinders 30 from a suitable pump and control device located within the tractor. The hydraulic pressure within the lift cylinders 30 produces a correlated lifting force which is transmitted to the lifting arms 32. Moreover, since the cylinders 30 are interconnected, hydraulic fluid can flow back and forth between the cylinders to accommodate the lateral tilting action on an implement 20 without affecting the lifting force exerted by each cylinder 30 on the respective lift arms 32.

Figure 4:
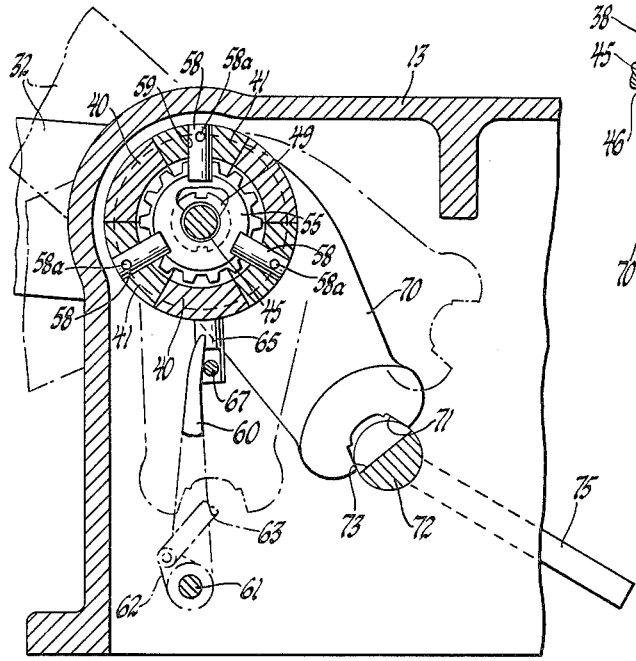
FIG. 4 is a section taken substantially along the line 4—4 in FIG. 3 with dash lines indicating alternate upper and lower positions of the lift arms.

In order to translate the position of the lift arms 32 to the hydraulic control system within the tractor, position follow-up and sensing means are also enclosed within the tractor rear housing 13. In the present instance, since the lift arms 32 may be relatively offset in their positions with respect to one another, it is desirable to average the position which is transmitted to the hydraulic system. As shown in FIG. 4, the position follow-up mechanism includes a sensing lever 60 which is secured to a cross rod 61 which is journalled in the tractor housing 13. The cross rod carries a lever arm 62 to which a control rod 63 is secured for transmitting the relative position of the sensing lever to the hydraulic system. In order to average the position of the lift arms 32, the interfitting elements 36, 37 are provided with radially extending, laterally spaced brackets 65 and 66 which are interconnected by a position rod 67. Since the element 37 is axially shiftable with respect to the other end element 36, the position rod 67 is slidably mounted within the lateral bracket 65. When the interfitting elements 36, 37 are axially separated, the sensing lever 60 is disposed to bear against the center portion of the position rod 67, as shown in FIG. 5. Thus, as the elements 36 and 37 rotate with respect to one another corresponding to a change in relative position of the lift arms 32, the control rod 63 translates the average of this movement to the hydraulic system within the tractor. Of course, when the interfitting elements are fully engaged, the lift arms 32 move in unison. Therefore, since it is then unnecessary to average their positions, the sensing lever 60 need not be centered on the position rod 67 (see FIG. 3).

It is another feature of the invention that the lift arms 32 may be locked in position when the elevatable hitch linkage is not in use. Also, when the tractor 10 is used to pull unmounted implement or other trailing device such as a wagon, a swinging drawbar (not shown) may be attached between the lower ends of the drop links 33. Under these circumstances, it is not necessary to utilize the hydraulically actuated lift cylinders since the drawbar can be maintained at normal height by locking the lift arms.

To lock the lift arms 32, a locking arm 70 is splined on the cross shaft 38 within the rear housing 13 of the tractor. The outer end of the locking arm 70 is reinforced and constructed in the form of an open jaw 71. Projecting laterally through one side wall of the housing 13 a lock pin 72 is disposed in the path described by the arm 70 as the shaft 38 rotates. Adjacent the open jaw 71 a groove 73 is formed in one side of the pin 72 in order to provide clearance for the lock arm 70 when the hitch linkage is hydraulically actuated. The side of the pin 72 opposite the groove 73 is solid and is engageable in the jaw 71 to block the arm against movement. For convenience in locking the arm 70, the pin 72 carries a handle 75 at its end for easy manipulation by the tractor operator. To maintain the pin 72 in either locked or unlocked position, a pair of ball members 76 are biased by a spring 77 toward opposed recesses 78 in the wall of the housing 13.

It will also be appreciated that the interfitting end elements 36, 37 which interconnect the lift arms 32, together with the position sensing mechanism and the locking arm 70 are all enclosed within the tractor rear housing 13. Thus, these parts are protected from dust and dirt which would detrimentally affect their operation. Moreover, the straightforward arrangement of the individual parts of the interconnecting means provides a rugged and durable assembly which is simple and economical to manufacture using mass manufacturing techniques and yet which is trouble free in operation even under prolonged conditions of heavy use.

We claim as our invention:

1. For use with a tractor having a pair of lift arms pivotally mounted on the rear housing thereof, the combination comprising, a pair of cross shafts each secured to a respective one of said lift arms and extending coaxially with respect to the pivot thereof into said rear housing, each of said cross shafts non-rotatably carrying an end element having a face portion with axially projecting axially tapered teeth, said teeth being narrower at their axial extremities than at their base portions with the teeth of one of said elements adapted to normally substantially completely engage the teeth of the other end element to prevent relative pivotal movement between said lift arms, and at least one of said end elements mounted for axially sliding movement so as to partially disengage said axially tapered teeth whereby a limited amount of free pivotal movement is provided for one of said lift arms with respect to the other.

2. For use with a tractor having a pair of lift arms pivotally mounted on the rear housing thereof, the combination comprising, a pair of cross shafts each secured to a respective one of said lift arms and extending coaxially with respect to the pivot thereof into said rear housing, each of said cross shafts non-rotatably carrying an end element having a face portion with axially projecting axially tapered teeth being narrower at their axial extremities than at their base portions with the teeth of one of said elements adapted to normally substantially completely engage the teeth of the other end element to prevent relative pivotal movement between said lift arms, at least one of said end elements mounted for axially sliding movement so as to partially disengage said axially tapered teeth whereby a limited amount of free pivotal movement is provided for one of said lift arms with respect to the other, and means including a manually operable handle for positive shifting of said one end element to separate said teeth.

3. For use with a tractor having a pair of lift arms pivotally mounted on the rear housing thereof, the combination comprising, a pair of cross shafts each secured to a respective one of said lift arms and extending coaxially with respect to the pivot thereof into said rear housing, each of said cross shafts non-rotatably carrying an end element having a face portion with axially projecting axially tapered teeth, said teeth being narrower at their axial extremities than at their base portions with the teeth of one of said elements adapted to normally substantially completely engage the teeth of the other end element to prevent relative pivotal movement between said lift arms, at least one of said end elements mounted for axially sliding movement so as to partially disengage said axially tapered teeth whereby a limited amount of free pivotal movement is provided for one of said lift arms with respect to the other, means including a manually operable handle for positive shifting of said one end element to separate said teeth, and means including a biasing spring for urging said end elements together against the frictional forces exerted on said teeth.

4. In a tractor having a rear housing on which a pair of laterally spaced lift arms are pivotally mounted for raising and lowering a mounted implement, a pair of hydraulic cylinders connected one to each of said lift arms for raising and lowering the trailing end of each of said lift arms, means interconnecting said lift arms, and means associated with said interconnecting means for selectively permitting limited relative pivotal movement between said lift arms during normal operation so that said mounted implement may assume a limited laterally tilted position with respect to the tractor, and uninterrupted conduit means interconnecting said hydraulic cylinders one to another for insuring free hydraulic pressure fluid flow from one cylinder to the other in response to the relative pivotal movement between said lift arms and limited lateral tilting movement of the implement without altering the lifting force of either of said cylinders.

5. For use with a tractor having a pair of laterally spaced lift arms pivotally mounted on the rear housing thereof, the combination comprising, a pair of hydraulically operated lift cylinders each connected to a respective one of said lift arms for raising and lowering said arms, said cylinders each having a source of fluid under pressure, a pair of cross shafts each secured to a respective one of said lift arms and extending coaxially of the pivot thereof into said rear housing, each of said cross shafts non-rotatably carrying an end element having a face portion with axially projecting axially tapered teeth, said teeth being narrower at their axial extremities than at their base portions with the teeth of one of said end elements adapted to normally substantially completely engage the teeth of the other end elements so as to prevent relative pivotal movement of one of said lift arms with respect to the other, means for axially shifting at least one of said end elements with respect to the other so as to allow a limited amount of free pivotal movement of one of said lift arms with respect to the other, and means interconnecting said cylinders to permit the flow of pressure fluid from one cylinder to the other incident to the limited relative pivotal movement of one of said lift arms with respect to the other.

6. For use with a tractor having a pair of laterally spaced lift arms pivotally mounted on the rear housing thereof, the combination comprising, a pair of hydraulically operated lift cylinders each connected to a respective one of said lift arms for raising and lowering said arms, said lift cylinders coupled to a controlled supply of hydraulic pressure fluid within said tractor, a pair of cross shafts each secured to a respective one of said lift arms and extending coaxially with respect to the pivot thereof into said rear housing, each of said cross shafts non-rotatably carrying an interfitting end element, said end elements being selectively engageable with one another so as to prevent the relative pivotal movement of one of said lift arms with respect to the other, means for axially shifting at least one of said end elements so as to partially disengage said end elements and thereby permit limited amount of free pivotal movement of one of said lift arms with respect to the other, and means coupled to said end elements for sensing the average pivotal movement of said lift arms.

7. For use with a tractor having a pair of lift arms pivotally mounted on the rear housing thereof, the combination comprising, a pair of cross shafts each secured to a respective one of said lift arms and extending coaxially with respect to the pivot thereof into said rear housing, each of said cross shafts non-rotatably carrying an interfitting end element, said end elements being selectively engageable with one another so as to prevent the relative pivotal movement of one of said lift arms with respect to the other, means for axially shifting one of said end elements so as to partially disengage it from the other end element and allow limited pivotal movement of one of said lift arms with respect to the other, one of said cross shafts carrying a radially projecting lock arm within said rear housing, a pin rotatably supported on the rear housing transversely of the path described by said lock arm in the rotation of said shaft, said pin having a groove at one side affording clearance for the lock arm and a solid portion at the other side operative to block the arm against movement, and manually operable means for rotating said pin to selectively lock or release said shaft.

8. In an elevatable hitch linkage for a tractor having a source of hydraulic fluid under pressure, the pair of laterally spaced-apart draft links pivoted on the rear housing of the tractor with the trailing ends thereof adapted to mount and draw an implement, a pair of lift arms disposed over and above said draft links, with the forward ends thereof pivotally mounted on the rear housing of the tractor, said lift arms being connected to said draft links by a pair of vertically adjustable drop links, a pair of hydraulically operable lift cylinders connected one to each of said lift arms, means for interconnecting said forward ends of said lift arms to selectively permit limited pivotal movement of each of said lift arms with respect to the other during normal operation so that an implement connected to the trailing end of said draft links may tilt laterally relative to said tractor, supply lines communicating with the source of hydraulic fluid for raising and lowering said lift arms, and uninterrupted conduit means interconnecting said hydraulic lift cylinders one to another for insuring free hydraulic pressure fluid flow may freely flow between said cylinders in response to the limited lateral tilting movement of the implement without altering the lifting force of either of said cylinders.

References Cited by the Examiner

UNITED STATES PATENTS 2,776,613  1/1957  Orelind _____ 172—459 X
2,880,812  4/1959  Morse _____ 172—460

FOREIGN PATENTS 667,488  3/1952  Great Britain.
738,881  10/1955  Great Britain.

ABRAHAM G. STONE, *Primary Examiner.*

SAMUEL KOREN, CARL W. ROBINSON, WILLIAM A. SMITH, III, *Assistant Examiners.*